(12) United States Patent
Marrino et al.

(10) Patent No.: US 8,946,105 B2
(45) Date of Patent: Feb. 3, 2015

(54) METHODS FOR REMOVING IRON MATERIAL FROM A SUBSTRATE

(71) Applicant: Steag Energy Services GmbH, Essen (DE)

(72) Inventors: Birgit Marrino, Charlotte, NC (US); Thies Hoffmann, Lake Wylie, SC (US)

(73) Assignee: Steag Energy Services GmbH, Essen (DE)

( * ) Notice: Subject to any disclaimer, the term of this patent is extended or adjusted under 35 U.S.C. 154(b) by 0 days.

(21) Appl. No.: 13/801,896

(22) Filed: Mar. 13, 2013

(65) Prior Publication Data

US 2014/0271383 A1    Sep. 18, 2014

(51) Int. Cl.
*B01J 38/64* (2006.01)
*B01D 53/96* (2006.01)
*B01D 53/86* (2006.01)

(52) U.S. Cl.
CPC .............. *B01J 38/64* (2013.01); *B01D 53/96* (2013.01); *B01D 53/8625* (2013.01)
USPC ............................................. 502/33; 502/29

(58) Field of Classification Search
USPC .................................. 502/33, 29, 31, 25, 27
See application file for complete search history.

(56) References Cited

U.S. PATENT DOCUMENTS

| | | | |
|---|---|---|---|
| 7,569,506 B2 | 8/2009 | Foerster | |
| 7,723,251 B2 * | 5/2010 | Hartenstein et al. | 502/25 |
| 7,858,549 B2 | 12/2010 | Foerster | |
| 8,153,542 B2 | 4/2012 | Bruggendick et al. | |
| 8,268,743 B2 | 9/2012 | Tembaak et al. | |
| 2009/0233786 A1 | 9/2009 | Hartenstein et al. | |
| 2011/0160040 A1 | 6/2011 | Cooper et al. | |
| 2012/0053046 A1 | 3/2012 | Hoffmann et al. | |

FOREIGN PATENT DOCUMENTS

| | | |
|---|---|---|
| DE | 000010241004 A1 | 3/2004 |
| WO | WO2004022226 A1 | 3/2004 |

OTHER PUBLICATIONS

International Search Report and Written Opinion for Application No. PCT/US2014/015544 dated May 15, 2014, 9 pages.
*Reduction of $SO_3$: Minimizing $SO_2$ Oxidation With SCR Regenerated Catalyst*, American Coal Conference, Mar. 16, 2006, 21 pages.
Hartenstein, H. et al., *Catalyst Regeneration—An Integral Part of Proper Catalyst Management*, the 2001 EPRI Workshop on Selective Catalytic Reduction, Section 18 (Nov. 13-15, 2001) 11 pages.

* cited by examiner

*Primary Examiner* — Edward Johnson
(74) *Attorney, Agent, or Firm* — Alston & Bird LLP (57) ABSTRACT

Methods of removing iron from a catalytic converter having an accumulation of one or more iron compounds and regenerating a catalytic converter are provided. A catalytic converter having an accumulation of one or more iron compounds embedded or deposited thereon can be treated with a substantially aqueous alkaline solution in which the substantially aqueous alkaline solution includes an antioxidant.

34 Claims, 2 Drawing Sheets
(2 of 2 Drawing Sheet(s) Filed in Color)

METHODS FOR REMOVING IRON MATERIAL FROM A SUBSTRATE

TECHNICAL FIELD

The presently disclosed invention relates generally to methods of removing iron from a catalytic converter, particularly a DeNOx catalytic converter.

BACKGROUND

High temperature thermal processes, for example, the generation of steam for the production of electricity in power plants utilizing fossil fuels and biomass or the incineration of domestic waste, often create environmentally harmful by-products. These, among others, are fly ash, nitrogen oxide ($NO_x$—refers to NO and $NO_2$), and sulfur dioxides ($SO_2$ and $SO_3$). These compounds have to be removed from the flue gases of the high temperature thermal process before being discharged to the environment.

Desulphurization of the flue gas, for example removal of $SO_2$, may be carried out by applying known methods in which the $SO_2$ produced in the combustion process is oxidized to $SO_3$. This is done prior to exposure of the flue gases to the reduction catalyst. The $SO_3$ may then be absorbed into an alkaline solution and removed from the process, usually in the form of gypsum (calcium sulfate).

The standard for removing $NO_x$ from flue gases is the Selective Catalytic Reduction (SCR) process, where a reducing reagent, typically ammonia, is injected, mixed into the flue gas, and sent through a catalytic reaction chamber where a catalytic converter facilitates the reduction of $NO_x$ with the reducing agent to form nitrogen gas and water. The catalytic converter is typically made of a substrate and a nitrogen oxide reducing catalyst. The substrate can generally be of any appropriate material for supporting a catalyst, such as metals or ceramics. In plate-type configurations, for instance, the substrate can comprise the metal mesh (i.e., a metal substrate) on which titaniumdioxide (for example) in conjunction with a other compounds are supported and build a ceramic body or carrier material with a defined porous structure. As such, plate-type configurations include both a metal and ceramic substrate. Honeycomb- or corrugated-type configurations, however, do not utilize metal substrates. Instead, honeycomb- or corrugated-type configurations utilize titaniumdioxide (for example) in conjunction with other compounds to form monolithic structures known as ceramic substrates. In both cases, however, the nitrogen reducing catalyst (e.g., vandiumpentoxide, tungstenoxide, and molybdenumoxide) is embedded in or deposited on the titaniumdioxide. Moreover, the catalyst is embedded in or homogenously distributed throughout the substrate only during the initial production process.

Catalytically relevant metal compounds are added to the dough prior to extruding the catalyst. During the subsequent calcinations process the catalytically relevant substances are converted to the catalytic metal oxides (e.g., vandiumpentoxide, tungstenoxide, and molybdenumoxide). In some cases, however, a manufacturer may choose not to add the catalytically relevant substances to the dough but rather impregnated/soak the substrate in catalytically relevant substances followed by calcinations. In some cases a manufacturer may also add an impregnation step to selectively deposit the nitrogen reducing catalyst on the substrate. In other cases, however, a manufacturer may omit adding nitrogen reducing catalyst to the dough but impregnate the nitrogen reducing catalyst onto the substrate.

Throughout the operation of the catalyst, it becomes contaminated due to the accumulation of various substances from the flue gas on the catalyst. Most of them are responsible for the catalyst's decrease in activity such as Sodium, Potassium, Phosphorus and Arsenic. Others, like Iron, however, are known to be the main contributor for the increase of the $SO_2/SO_3$ conversion rate during the catalysts usage cycle. This type of contamination is due to chemical bonding of the compounds onto the catalyst. Iron contamination may come from a variety of sources, including the fuel burned in the power plant. For example, depending on the origin and age of coal, the natural iron content may range from about 5% to about 8% by weight, relative to the total amount of the mineral components in the coal.

It is generally known that during the regeneration of SCR catalysts, inorganic acids, such as sulfuric acid ($H_2SO_4$) and hydrochloric acid (HCl), may be used to clean and restore the catalyst, such as by a soaking step and a neutralizing step. Inorganic acids are typically odorless, which is another advantage to their use. Sulfuric acid, in particular, is relatively inexpensive and commercially available. In addition, sulfuric acid is known to not have any negative impact on the catalyst. However, treating a catalyst with sulfuric acid has disadvantages since the $H_2SO_4$ in a diluted aqueous solution also corrodes the steel casings of the catalyst. Corrosion of the catalyst casings may also result in release of water soluble iron compounds that can penetrate the pores of the SCR catalyst, further enhancing the undesired $SO_2$ to $SO_3$ conversion process.

The removal of iron contaminants from a DeNOx catalyst has been described in U.S. Pat. No. 7,569,506 in which the catalyst is placed in a reaction solution comprising an aqueous solution of an inorganic or organic acid with the addition of one or more antioxidants. Inorganic acids, namely hydrochloric acid, phosphorus acid, nitric acid, and, in particular, sulfuric acid, are described. Organic acids, such as relatively strong organic acids, including oxalic acid, citric acid, malonic acid, formic acid, chloroacetic acid, and benzole sulfonic acid were also used. Although the methods described in this reference were effective in removing iron accumulation on the catalyst, the strong acids described in the reference also liberated iron ions from steel substrates and the steel casings of the catalyst. These iron ions can then penetrate the pores of the catalyst, potentially enhancing the undesired $SO_2$ to $SO_3$ conversion.

Accordingly, there remains a need for alternative methods for removing iron (e.g., iron compounds) accumulated on a catalytic converter to remove contamination by iron compounds and provide optimum performance of the catalytic converter while minimizing or reducing the $SO_2$ to $SO_3$ conversion process within the flue gas stream.

BRIEF SUMMARY

One or more embodiments of the present invention may address one or more of the aforementioned problems. Certain embodiments according to the present invention provide methods of removing iron from a catalytic converter having an accumulation of one or more iron compounds. According to certain embodiments of the present invention, the methods of removing iron from a catalytic converter having an accumulation of one or more iron compounds can comprise the steps of (i) treating the catalytic converter with a substantially aqueous alkaline solution, in which the substantially aqueous alkaline solution comprises an antioxidant and (ii) removing at least a portion of the one or more iron compounds accumulated on the catalytic converter. As such, certain embodiments of the present invention comprise methods in which a contaminated (e.g., contaminated with one or more iron compounds) catalytic converter is treated with a basic or alkaline wash (e.g., spray) or bath in the presence of an antioxidant (e.g., a caustic treatment including at least one antioxidant).

In another aspect, the present invention provides methods of regenerating a catalytic converter. In accordance with certain embodiments of the present invention, a catalytic converter having an accumulation of one or more iron compounds can be treated with a substantially aqueous alkaline solution including or in the presence of an antioxidant and removing at least a portion of the one or more iron compounds accumulated on the catalytic converter. After a portion of the accumulated iron compounds has been removed, the catalytic converter can be washed (e.g., washed with water or an aqueous solution) and optionally at least partially dried. The catalytic converter, having at least a portion of the one or more iron compounds removed, can be impregnated with at least one NOx removal catalyst. The NOx removal catalyst can comprise catalytic active metals to provide a regenerated catalytic converter.

In yet another aspect, the present invention provides regenerated catalytic converters that have been regenerated according to the methods described herein.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Having thus described embodiments of the invention in general terms, reference will now be made to the accompanying drawings, which are not necessarily to scale, and wherein:

DETAILED DESCRIPTION

The present invention now will be described more fully hereinafter with reference to the accompanying drawings, in which some, but not all embodiments of the inventions are shown. Indeed, this invention can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In one aspect, embodiments of the present invention are directed to methods of removing iron from a catalytic converter having an accumulation of one or more iron compounds. According to certain embodiments of the present invention, the methods of removing iron from a catalytic converter having an accumulation of one or more iron compounds can comprise the steps of (i) treating the catalytic converter with a substantially aqueous alkaline solution, in which the substantially aqueous alkaline solution comprises an antioxidant and (ii) removing at least a portion of the one or more iron compounds accumulated on the catalytic converter. As such, certain embodiments of the present invention comprise methods in which a contaminated (e.g., contaminated with one or more iron compounds) catalytic converter is treated with a basic or alkaline wash (e.g., spray) or bath in the presence of an antioxidant (e.g., a caustic treatment including at least one antioxidant). In certain preferred embodiment, the substantially aqueous alkaline solution comprises at least one antioxidant comprising ascorbic acid, mineral ascorbate salts, ammonium ascorbate, and combinations thereof.

In accordance with certain embodiments of the present invention, the method of removing iron from a catalytic converter and the method of regenerating a catalytic converter having an accumulation of one or more iron compounds facilitates the prevention of the formation of ferric iron ($Fe^{3+}$). Ferric iron can undesirably precipitate as iron (III) hydroxide (i.e., $Fe(OH)_3$) and deposit irreversibly in the pores of the catalytic converter. As referenced earlier, iron is a catalyst poison which can accumulate on the catalytic converter via exposure to flue gas. For instance, iron can be present in the fly ash deposited on the catalytic converter. Additionally, however, catalytic converters can be exposed to further iron content from the box frames and module frames which hold the catalytic converter in place during the cleaning and/or regeneration process. Certain embodiments of the present invention can beneficially remove a significant portion of iron content from operation and/or mitigate further deposition of iron onto or within the pores of the catalytic converter. Preferably, such embodiments comprise a treatment step utilizing a substantially aqueous alkaline solution including an antioxidant in which the formation or oxidation to $Fe^{3+}$ is mitigated so as to prevent the precipitation and/or deposition of $Fe(OH)_3$ onto or within the catalytic converter.

Substrate

In accordance with certain embodiments of the present invention, the substrate that is treated for removing at least a portion of accumulation iron compounds can comprise a substrate capable of supporting or having embedded therein one or more metals that act as a catalyst, particularly at least one nitrogen oxide reduction catalyst. In certain embodiments, a preferred substrate can comprise or be referred to as a catalyst support material or catalytic converter substrate material. The substrate, according to certain embodiments, can be of any appropriate material for supporting a catalyst. Preferred substrates include metal and/or ceramic substrates. Particularly preferred substrates include metal, ceramic, and/or metal oxide substrates having plate, honeycomb, corrugated or mesh-type configurations.

Metallic substrates that can be used in accordance with certain embodiments of the present invention can be composed of one or more metals or metal alloys. In one embodiment, for instance, the metallic substrates can be employed as a mesh-type support substrate. Preferred metallic materials include heat resistant metals and metal alloys such as titanium and stainless steel as well as other alloys in which iron is a substantial or major component. Such alloys may contain, for example, one or more metals selected from the group consisting of nickel, chromium and aluminum.

In certain embodiments, the catalytic converter can comprise a metallic substrate, particularly in the form of a mesh-type support, wherein the metallic substrate material is comprised of a metal alloy material. In certain preferred embodiments, the alloy material comprises from 3 wt % to 30 wt % chromium, from 1 wt % to 10 wt % aluminum, or from 5 wt % to 50 wt % nickel, based on total weight of the metal substrate (excluding catalyst).

The alloys may also contain small or trace amounts of one or more other metals such as manganese, copper, vanadium, titanium and the like. The surface of the metal carriers may be oxidized at high temperatures (e.g., 1000° C. and higher) to improve the corrosion resistance of the alloy, such as by forming an oxide layer on the surface of the carrier. Such high temperature-induced oxidation may enhance the adherence of a refractory metal oxide support and catalyst components to the carrier.

One particular metal material that can be used as a substrate in a catalytic converter is an iron-chromium alloy. In certain embodiments, the iron-chromium alloy can be provided in the form of a foil, and preferably can have a thickness of from about 0.02 mm to about 0.06 mm.

In addition to metallic substrates, ceramic substrates can be used in accordance with certain embodiments of the present invention and generally include any suitable metal oxide or refractory material. Examples of such materials include, but are not limited to, titania, alumina, silica, alumina-silica, zirconia, magnesium oxide, hafnium oxide, lanthanum oxide, cordierite, cordierite-alpha alumina, silicon nitride, zircon mullite, spodumene, alumina-silica magnesia, zircon silicate, sillimanite, magnesium silicates, zircon and petalite.

According to certain embodiments of the present invention, the catalytic converter comprises a honeycomb structure or configuration. Any suitable substrate material as described above can generally be employed depending on an intended end use (e.g., to be used in a particular power plant predominately burning a certain type of material). In certain embodiments, the catalytic converter comprises a monolithic catalytic converter having a plurality of parallel gas flow passages/conduits. The passages can preferably comprise substantially straight paths that extend from their fluid inlet to their fluid outlet. The catalytic converter has embedded therein or deposited thereon the catalytic material (e.g., at least one $NO_x$ reduction catalyst). The flow passages are preferably thin-walled. Suitable cross-sectional shape and size of the flow passages include trapezoidal, rectangular, square, sinusoidal, hexagonal, oval, circular, etc., structures. Such structures preferably contain from about 5 to about 600 gas inlet openings (i.e., "cells") per square inch of cross section.

In certain preferred embodiments, the catalytic converter comprises a DeNOx catalyst. In more preferred embodiments, the catalytic converter comprises a SCR catalyst. Prior to treatment according to certain embodiments of the present invention, the catalytic converter comprises a substantially deactivated catalytic converter with approximately 20% to 70% loss of DeNOx performance activity.

Iron and Iron Compounds

As noted above, certain embodiments of the present invention are particularly effective in removing iron from a catalytic converter having an accumulation of one or more iron compounds. In accordance with certain embodiments, the iron content can be deposited on the catalytic converter as a result of at least a portion of the coal combustion product containing iron (e.g., iron containing compounds) coming into contact with the catalytic converter. As noted above, the iron (e.g., iron containing compounds) can accumulate on the catalytic converter via exposure to flue gas. For instance, iron can be present in the fly ash deposited on the catalytic converter. Additionally, however, catalytic converters can be exposed to further iron content from the box frames and module frames which hold the catalytic converter in place during the cleaning and/or regeneration process.

As used herein, the term "iron containing compound" includes an ionic iron compound, such as, but not limited to, ionic compounds formed with a ferrous ($Fe^{2+}$) ion or ionic compounds formed with a ferric ($Fe^{3+}$) ion (including mixtures of iron containing compounds). As discussed herein, a catalytic converter that is contaminated with or has an accumulation of one or more iron compounds can have an iron concentration, either deposited on the catalyst or chemically reacted with the catalyst, of greater than 0.3% by weight of $Fe_2O_3$ (as measured by X-ray fluorescence) based on total weight of the catalyst material not including the metal substrate onto which a catalyst (i.e., plate type catalysts) may be incorporated. Iron concentration can be measured as $Fe_2O_3$ concentration in the catalyst using X-ray fluorescent technology, which technology may also be used to measure concentrations of other components, including $SiO_2$, $Al_2O_3$, $TiO_2$, CaO, MgO, BaO, $Na_2O$, $K_2O$, $SO_3$, $P_2O_5$, $V_2O_5$, $WO_3$, $MoO_3$, As, and $Cr_2O_3$. Other methods may be used to measure iron concentration. In specific embodiments, the SCR catalyst may have an iron concentration ranging from about 0.3% to about 12% by weight of $Fe_2O_3$ in the catalyst as measured using X-ray fluorescence.

Substantially Aqueous Alkaline Composition

The substantially aqueous alkaline composition according to certain embodiments of the present invention that can be used in methods to remove at least a portion of one or more iron compounds accumulated on the catalytic converter preferably comprises a substantially aqueous alkaline solution. As used herein, the term "substantially aqueous alkaline solution" generally includes a solution that comprises water and at least one chemical species that confers alkalinity and at least one antioxidant compound dissolved in the water in such a concentration that the solution is still free flowing as a liquid (e.g., dissolved up to the saturation point). A substantially aqueous alkaline solution may further comprise one or more other compounds such as an organic solvent, such as a polar organic solvent, for example an alcohol, provided the other compound(s) do not interfere with the ability (wettability) of the substantially aqueous alkaline solution to contact and wet the surface of the catalytic converter, including penetration of the solution into the pores of the catalytic converter Exemplary antioxidants that can be used individually or in any combination in accordance with certain embodiments of the present invention can include the following: substituted phenols including phenolic carboxylic acids, hydroquinones, catechols, and/or inorganic or organic, aliphatic, araliphatic or aromatic mercapto compounds, dithiocarbonates, hydroxycarboxylic acids or enediols and/or phosphates or phosphonates, which also includes salts, esters, metal complexes or mixtures of such compounds.

Normal hydroquinone and catechol as well as substituted phenols, namely gallic acid and gallates and in particular ascorbic acid, that is an effective antioxidant on account of its enediol structure, have proven to be particularly advantageous. In certain preferred embodiments, the antioxidant can be selected from one or more of ascorbic acid (including all isomers), mineral ascorbate salts, and ammonium ascorbate. One preferred mineral ascorbate salt comprises sodium ascorbate.

In certain embodiments of the present invention, the substantially aqueous alkaline solution can be prepared by mixing the antioxidant(s) with water (and a base to adjust the pH as desired) to form an aqueous solution having a desired antioxidant concentration. According to embodiments of the present invention, the concentration of any component is determined according to weight of the component added into a mixture to form the final material. For example, a concentration of 10 wt % of a component means that 10 parts by weight of the component is mixed with 90 parts by weight of all other components in the final composition to form a 10 wt % concentration of that component.

The substantially aqueous alkaline solution can contain an amount of antioxidant (e.g., ascorbic acid, mineral ascorbate salts, and ammonium ascorbate) effective for removing a portion of accumulated iron present on the catalytic converter and/or mitigating or preventing the formation of ferric ions during the method. For example, the substantially aqueous alkaline solution can be prepared at a total antioxidant concentration of from about 0.05 wt % to about 5 wt %, based on total weight of the substantially aqueous alkaline solution used to treat the catalytic converter. Preferably, the substantially aqueous alkaline solution comprise from about 0.1 wt. % to about 2.0 wt. % of the antioxidant or from about 0.1 wt. % to about 1.0 wt. % of the antioxidant.

In certain embodiments according to the present invention, treatment of the catalytic converter with the substantially aqueous alkaline solution can be carried out at an average pH of from slightly greater than 7 to 14. Preferably, treatment of the catalytic converter with the substantially aqueous alkaline solution is carried out at an average pH of from about 8 to about 14.

Although the chemical species employed to confer alkalinity to the substantially aqueous alkaline solution in not particularly limited, certain preferred chemical species for conferring alkalinity (e.g., to raise and/or maintain the pH greater than 7) include inorganic bases selected from alkali metal hydroxides (e.g., NaOH) and hydroxides of alkaline earth metals. Alkali metal hydroxide and/or hydroxide of an alkaline earth metal can be present in a concentration range of from about 0.1 wt. % to about 10 wt. % (e.g., 0.1-8 wt. %; 0.1-5 wt. %; 0.1-4 wt. %; etc.) based upon the weight of the bath or solution, The catalytic converter can be treated or contacted with the substantially aqueous alkaline solution from about 1 minute to about 6 hours (e.g., 0.25-5 hours; 0.25-3 hours; 0.25-2 hours; etc.).

In certain embodiments, the catalytic converter can preferably be treated or contacted with the substantially aqueous alkaline solution in a vessel that is suitable for immersing or submerging the catalytic converter into the substantially aqueous alkaline solution. Catalytic converters to be treated according to embodiments of the present invention can be completely or partially submerged in the substantially aqueous alkaline solution as desired. Agitation during treatment can be preferably provided during treatment of the catalytic converter. For instance, either the substantially aqueous alkaline solution can be agitated or the converter can be physically moved to cause agitation. The substantially aqueous alkaline solution can be agitated by any suitable means, including by mechanical means or by flowing a fluid such as air through the treatment composition.

In accordance with certain embodiments, therefore, the methods of removing iron from a catalytic converter can also include at least one of moving the catalytic converter within the substantially aqueous alkaline solution, agitating the substantially aqueous alkaline solution, and recirculating substantially aqueous alkaline solution.

In accordance with certain embodiments, the average temperature during treatment of the converter comprises the substantially aqueous alkaline solution comprises at least 10° C. More preferably, the average temperature during treatment of the catalytic converter the substantially aqueous alkaline solution comprises from 10° C. to 90° C., more preferably from 20° C. to 80° C., and most preferably from 30° C. to 50° C.

In certain embodiments, the catalytic converter can be exposed to a high-frequency ultrasonic vibration, with a simultaneous flow of substantially aqueous alkaline solution across the catalytic converter. The intensity of the ultrasound can be regulated and adapted to the degree of soiling. Preferably, ultrasonic sound is applied in the range of from about 15 kHz to 150 kHz with the applied power ranging from 3 to 15 watts per liter of aqueous composition. For instance, the percentage of power applied from each transducer can be varied allowing for a variance in power. Additional transducers can be added, or removed, further varying the power output. According to certain embodiments, therefore, the sonication feature can allow for different frequencies to be applied to the treatment tank in which the catalytic converter is being treated with the substantially aqueous alkaline solution. That is, a single frequency or a mixture of frequencies can be applied simultaneously if so desired.

Accordingly, certain embodiments of the present invention can comprise a step of treating the catalytic converter with a substantially aqueous alkaline solution further comprises subjecting the substantially aqueous alkaline solution to an ultrasonic treatment for at least a portion of the time in which the catalytic converter is at least partially submerged in the substantially aqueous alkaline solution.

In accordance with certain embodiments of the present invention, the methods for removing iron from a catalytic converter can further comprise a step (one or more) of treating the catalytic converter with a substantially aqueous acidic solution. The treatment of the catalytic converter with a substantially aqueous acidic solution can be performed prior to treatment with the substantially aqueous alkaline solution, after treatment with the substantially aqueous alkaline solution, or both. In certain preferred embodiments, the catalytic converter is treated with the substantially aqueous acidic solution prior to the step of treating the catalytic converter with a substantially aqueous alkaline solution, and more preferably the substantially aqueous acidic solution includes at least one antioxidant. Preferably, the pH of the substantially aqueous acidic solution ranges from about 1 to about 6 (e.g., 1-5, 2-4, etc.).

As used herein, the term "substantially aqueous acidic solution" generally includes a solution that comprises water and at least one chemical species that confers acidity dissolved in the water in such a concentration that the solution is still free flowing as a liquid (e.g., dissolved up to the saturation point). As noted above, a substantially aqueous acidic solution can also comprise an antioxidant. A substantially aqueous acidic solution may further comprise one or more other compounds such as an organic solvent, such as a polar organic solvent, for example an alcohol, provided the other compound(s) do not interfere with the ability (wettability) of the substantially aqueous solution to contact and wet the surface of the catalytic converter, including penetration of the solution into the pores of the catalytic converter.

The chemical species used to confer acidity to the substantially aqueous acidic solution is not particularly limited and can be selected from inorganic and/or organic acids. For example, sulfuric acid and hydrochloric acid are merely two examples of suitable chemical species suitable for conferring the appropriate acidity to the substantially aqueous acidic solution. In certain embodiments, however, the substantially aqueous acidic solution comprises an acidic reactive salt. Preferably the acidic reactive salt comprises an ammonium-based acidic reactive salt.

As used herein, the term "acidic reactive salt" means any ionic salt that forms an acidic solution when dissolved in water (i.e., an aqueous solution having a pH of less than 7.0) and in specific embodiments, any ionic salt that forms an acidic aqueous solution having a pH of less than 5.0. Examples of acidic reactive salts suitable for use in various embodiments of the present disclosure include, but are not limited to ammonium-based acidic reactive salts, such as $NH^{4+}$, primary, secondary, or tertiary ammonium salts (primary, secondary or tertiary ammonium salts may be substituted with one or more alkyl group or other suitable organic group), having a suitable counterion, such as a counter anion selected from the group consisting of fluoride ($F^-$), chloride ($Cl^-$), bromide ($Br^-$), iodide ($I^-$), astatide ($At^-$, nitrate ($NO_3^-$), dihydrogen phosphate ($H_2PO_4^-$), hydrogen sulfate ($HSO_4^-$), and sulfate ($SO_4^{2-}$). In other embodiments, the acidic reactive salt may include salts of alkaline earth metals having a counterion selected from the group consisting of fluoride ($F^-$), chloride ($Cl^-$), bromide ($Br^-$), iodide ($I^-$), astatide ($At^-$, nitrate ($NO_3^-$), dihydrogen phosphate ($H_2PO_4^-$), hydrogen sulfate ($HSO_4^-$), and sulfate ($SO_4^{2-}$).

In certain embodiments, the acidic reactive salt may be an ammonium salt, such as ammonium fluoride, ammonium chloride, ammonium bromide, ammonium iodide, ammonium nitrate, ammonium sulfate or a mixture of any thereof. In specific embodiments, the acidic reactive salt can be ammonium chloride, ammonium sulfate or mixtures thereof. In certain embodiments, the substantially aqueous solution may comprise the acidic reactive salt in a concentration ranging from about 0.1% to about 10.0%. In other embodiments, the substantially aqueous solution may comprise the acidic reactive salt in a concentration ranging from about 0.1 to about 4.0% by weight, and in other embodiments from about 0.5% to about 2.0% by weight of the solution. In still other embodiments, the substantially aqueous solution may comprise sufficient acidic reactive salt to make the pH of the solution less than 5.0.

In certain preferred embodiments, the substantially aqueous acidic solution comprises an ammonium-based acidic reactive salt is selected from the group consisting of ammonium chloride, ammonium fluoride, ammonium nitrate, ammonium sulfate, and combinations thereof.

Although not necessary, the substantially aqueous acidic solution can comprise an antioxidant. The particular antioxidant used is not particularly limited but can include substituted phenols, hydroquinones, catechols, aliphatic mercapto compounds, araliphatic mercapto compounds, aromatic mercapto compounds, dithiocarbonates, hydroxycarboxylic acids, enediols, phosphites, phosphonates, or combinations thereof. In certain preferred embodiments, the antioxidant can be selected from ascorbic acid, mineral ascorbate salts, ammonium ascorbate, and combinations thereof.

In certain embodiments, the catalytic converter can be exposed to a high-frequency ultrasonic vibration, with a simultaneous flow of substantially aqueous acidic solution across the catalytic converter. The intensity of the ultrasound can be regulated and adapted to the degree of soiling. Preferably, ultrasonic sound is applied in the range of from about 15 kHz to 150 kHz with the applied power ranging from 3 to 15 watts per liter of aqueous composition. For instance, the percentage of power applied from each transducer can be varied allowing for a variance in power. Additional transducers can be added, or removed, further varying the power output. According to certain embodiments, therefore, the sonication feature can allow for different frequencies to be applied to the treatment tank in which the catalytic converter is being treated with the substantially aqueous alkaline solution. That is, a single frequency or a mixture of frequencies can be applied simultaneously if so desired.

Accordingly, certain embodiments of the present invention can comprise a step of treating the catalytic converter with a substantially aqueous acidic solution further comprising subjecting the substantially aqueous acidic solution to an ultrasonic treatment for at least a portion of the time in which the catalytic converter is at least partially submerged in the substantially aqueous acidic solution.

According to certain embodiments of the present invention, a portion of any fly ash and/or large particles of contaminants located on the surface of the catalytic converter being treated can be physically removed prior to treating the catalytic converter with either the substantially aqueous alkaline solution or the substantially aqueous acidic solution. In such embodiments, the physical removal of fly ash and contaminants can be accomplished, for example, by moving a stream of pressurized vapor, (e.g., air) across or through the catalytic converter to loosen or dislodge a portion of material that has collected on the catalytic converter. In one particular example, an air gun (e.g., 50-100 psi) can be used as a source of pressurized air. A vacuum device can also be used to collect loose or dislodged particles. Total time for dislodging particles from the catalytic converter depends on the size of the catalytic converter, but can typically range from 5 to 60 minutes. In certain preferred embodiments, a portion of any fly ash and/or large particles of contaminants located on the surface of the catalytic converter being treated can be physically removed by a blasting technique in which the catalytic converter is treated with a blasting stream comprising a pressurized carrier gas and a particulate blasting medium directed at a flue gas inlet side of the catalytic converter. The particulate blasting medium can include dry ice particulates, aluminum oxide particulates, sand or silica particulates, silicon carbide particulates, crushed glass, glass beads, plastic beads, pumice, steel shot, steel grit, corn cob particulates, nut shell particulates, soda particulates, ice particulates, and combinations of any thereof. The particulate blasting medium can have a size ranging from about 0.05 mm up to 20 mm. According to certain embodiments, the blasting stream can comprise a pressurized carrier gas that propels the particulate blasting medium at the catalytic converter. The carrier gas can be any suitable gas that may be pressurized. Examples of suitable carrier gases include, but are not limited to, air, nitrogen, carbon dioxide, inert or noble gases, and mixtures of any thereof. The carrier gas may be pressurized to a pressure sufficient to cause the blasting stream to leave the nozzle of the blasting device at a pressure ranging from about 17.4 psig to about 4000 psig (about 900 torr to about $2.07 \times 10^5$ torr). In specific embodiments, the pressurized carrier gas may be air. According to certain embodiments, the pressurized air may have a dew point ranging from about 0° C. to about 38° C. Suitable blasting techniques are described in greater detail in U.S. Pat. No. 8,268,743, which is hereby incorporated by reference.

Although various features of certain embodiments of the present invention have been described herein. A few exemplary (non-limiting) methods of removing iron from a catalytic converter having an accumulation of one or more iron compounds are provided below. For instance, the following exemplary methods recited specific temperatures, times, pH ranges, and concentrations. These specific recitations are merely representative and can be individually varied in accordance with the entire present disclosure. For example, the following exemplary embodiments use ascorbic acid at 0.3 wt. %. However, each of the following exemplary embodiments can be modified to include any of the antioxidant (e.g., ascorbic acid) concentrations discussed in the present disclosure.

In one particular embodiment, the method of removing iron from a catalytic converter having an accumulation of one or more iron compounds can comprise treating the catalytic converter to the following sequential treatment steps:

1. Water, 0.3% Ascorbic Acid at about 50° C. for about 1 hr or until unplugged;
2. Alkaline treatment with 4% Sodium Hydroxide, 0.3% Ascorbic Acid at about 40° C. for about 1 hr;
3. Ultrasound, Alkaline treatment with 4% Sodium Hydroxide, 0.3% Ascorbic Acid at about 40° C. for about 1 hr;
4. 0.3% (Formic Acid or Sulfuric Acid) solution at about 40° C. for about 1 to 2 hrs; and
5. Cascade—counter-flow or soak with deionized water.

In another particular embodiment, the method of removing iron from a catalytic converter having an accumulation of one or more iron compounds can comprise treating the catalytic converter to the following sequential treatment steps:

1. Alkaline treatment with 4% Sodium Hydroxide, 0.3% Ascorbic Acid at about 40° C. for about 1 hr;
2. Ultrasound, Alkaline treatment with 4% Sodium Hydroxide, 0.3% Ascorbic Acid at about 40° C. for about 1 hr;
3. 0.3% (Formic Acid or Sulfuric Acid) solution at about 40° C. for about 1 to 2 hrs; and
4. Cascade—counter-flow or soak with deionized water.

In another particular embodiment, the method of removing iron from a catalytic converter having an accumulation of one or more iron compounds can comprise treating the catalytic converter to the following sequential treatment steps:

1. Water at 50° C. for about 1 hr or until unplugged;
2. Alkaline treatment with 4% Sodium Hydroxide, 0.3% Ascorbic Acid at about 40° C. for about 1 hr;
3. Ultrasound, Alkaline treatment with 4% Sodium Hydroxide, 0.3% Ascorbic Acid at about 40° C. for about 1 hr;
4. 0.3% (Formic Acid or Sulfuric Acid) solution at about 40° C. for about 1 to 2 hrs; and
5. Cascade—counter-flow or soak with deionized water.

In another particular embodiment, the method of removing iron from a catalytic converter having an accumulation of one or more iron compounds can comprise treating the catalytic converter to the following sequential treatment steps:

1. 0.3% Sulfuric Acid treatment at about 50° C. for about 1 hr or until unplugged;
2. Alkaline treatment with 4% Sodium Hydroxide, 0.3% Ascorbic Acid at about 40° C. for about 1 hr;
3. Ultrasound, Alkaline treatment with 4% Sodium Hydroxide, 0.3% Ascorbic Acid at about 40° C. for about 1 hr;
4. 0.3% (Formic Acid or Sulfuric Acid) solution at about 40° C. for about 1 to 2 hrs; and
5. Cascade—counter-flow or soak with deionized water.

In another particular embodiment, the method of removing iron from a catalytic converter having an accumulation of one or more iron compounds can comprise treating the catalytic converter to the following sequential treatment steps:

1. Water, 0.3% Ascorbic Acid and less than about 3% of an Ammonium salt (e.g., Ammoniumchloride or Ammoniumsulfate) at about 50° C. for about 1 hr or until unplugged;
2. Alkaline treatment with 4% Sodium Hydroxide, 0.3% Ascorbic Acid at about 40° C. for about 1 hr;
3. Ultrasound Alkaline treatment with 4% Sodium Hydroxide, 0.3% Ascorbic Acid at about 40° C. for about 1 hr;
4. 0.3% Formic Acid solution at about 40° C. for about 1 to 2 hrs; and
5. Cascade—counter-flow or soak with deionized water.

Regeneration

In addition to providing a method of removing iron from a catalytic converter having an accumulation of one or more iron compounds, another aspect of the invention provides methods of regenerating a catalytic converter. In accordance with certain embodiments of the present invention, a catalytic converter (e.g., a DeNOx catalyst and/or SCR catalyst) having an accumulation of iron (e.g., iron containing compounds) deposited or chemically bonded thereon can be regenerated for commercial operation after being subjected to any of the previously described methods for removing iron from a catalytic converter having an accumulation of one or more iron compounds.

In accordance with certain embodiments of the present invention, for instance, a catalytic converter having an accumulation of one or more iron compounds can be treated with a substantially aqueous alkaline solution including or in the presence of an antioxidant and removing at least a portion of the one or more iron compounds accumulated on the catalytic converter. After a portion of the accumulated iron compounds has been removed, the catalytic converter can be washed (e.g., washed with water or an aqueous solution) and optionally at least partially dried. The catalytic converter, having at least a portion of the one or more iron compounds removed, can be impregnated with at least one NOx removal catalyst. The NOx removal catalyst can comprise catalytic active metals to provide a regenerated catalytic converter.

In accordance with certain embodiments of the present invention, the catalytic converter being regenerating can comprise a honeycomb, corrugated or mesh-type configuration. For example, the catalytic converter to be treated/regenerated can comprise a honeycomb-style catalytic converter including a plurality of honeycomb shaped channels in which at least a portion of the honeycomb shaped channels are plugged or blinded over prior to treatment/regeneration.

Prior to the step of impregnation with at least one $NO_x$ removal catalyst, a step of at least partially drying the catalytic converter can be performed (e.g., after having at least a portion of the iron accumulation removed according to embodiments disclosed herein). Drying can be accomplished by any suitable means. Preferably the catalytic converter is dried in air. More preferably, the catalytic converter is dried by passing air across surfaces of the catalytic converter. The air that is used for drying is preferably at a temperature of from 20° C. to 700° C., more preferably from 100° C. to 300° C.

Once the catalytic converter is at least partially dried, the catalytic converter can be impregnated with at least one $NO_x$ removal catalyst. This impregnation can be used to return the catalytic converter to its former $NO_x$ removal activity or to enhance $NO_x$ removal activity from any baseline condition (e.g., a pre-regeneration $NO_x$ removal activity level). For instance, the pre-regeneration $NO_x$ removal activity level can comprise a $NO_x$ removal activity level exhibited by the catalytic converter when new (e.g., prior to being in operation in a power plant). Alternatively, the pre-regeneration $NO_x$ removal activity level can comprise a $NO_x$ removal activity level exhibited by the catalytic converter during any time period of operation in a combustion process.

The catalytic converter can be impregnated with one or more $NO_x$ reduction catalyst metals selected from the group consisting of Group 4, 5 and 6 metals. It should be noted, however, that the chemicals used for impregnation are precursors of the actual NOx reduction catalyst. That is, a subsequent heat treatment on-site or during the start-up of the SCR system oxidizes the metals and chemically bonds them to the substrate. In one embodiment, the catalytic converter is impregnated with vanadium or tungsten so that the active component is supported on or embedded in the catalytic converter as is generally understood in the art. As noted above, however, only during the initial production process of the catalytic converter is typically when the vanadium and tungsten is embedded in or homogeneously distributed throughout the substrate since it is added to the substrate dough prior to the extrusion and calcination process. During an impregnation process the vanadium or tungsten are supported on the substrate.

As one example of impregnating the catalytic converter with vanadium, the catalytic converter can be soaked in an aqueous solution prepared by dissolving a vanadium compound (e.g., vanadium oxalate, ammonium metavanadate or vanadyl sulfate) in water, an organic acid, or an amine solution. As one example, a treated catalyst is placed in a solution of vanadium oxylate which contains from 0.1 wt. % to 10 wt. % vanadium for a period of from 1 minute to 60 minutes, preferably from 2 minutes to 20 minutes. Following vanadium impregnation, the catalytic converter is heat treated in a drying oven to a final temperature of at least 100° C., preferably at least 150° C. In one embodiment, the impregnated catalytic converter (e.g., a regenerated catalytic converter) contains about 0.3% by weight to about 3% by weight of $V_2O_5$, based on the total weight of the impregnated catalytic converter without the metals substrate. The catalytic converter is preferably heat treated in a calcining furnace to convert the vanadium compound to its catalytically useful oxide form, $V_2O_5$, preferably at least 300° C., more preferably 425° C. Heating above 450° C. may cause the titanium dioxide crystal structure to change to the undesirable rutile crystal structure. The actual amount of vanadium taken up by the catalytic converter in the impregnation process is measured by x-ray fluorescence spectroscopy.

As one example of impregnating the catalytic converter with tungsten, the catalytic converter can be soaked in an aqueous solution prepared by dissolving a tungsten compound (e.g., ammonium-paratungstate or tungsten chloride) in water, hydrochloric acid, an amine solution or an organic acid. In certain embodiments, tungsten is impregnated in combination with vanadium. This can be accomplished in a single step or in separate steps.

As one example of tungsten and vanadium impregnation, chemically compatible forms of tungsten and vanadium, such as ammonium meta-vanadate and ammonium para-tungstate, are combined in a single solution containing from 2 to 100 g/l vanadium in the ammonium vanadate solution (measured as $V_2O_5$), and from 5 to 65 g/l tungsten in the ammonium para-tungstate solution (measured as $WO_3$). A treated catalyst is exposed to this base metal containing solution for a period of from 1 second to 60 minutes, preferably from 2 seconds to 2 minutes, and then heat treated in a drying oven to a final temperature of at least 100° C., preferably at least 150° C. The catalytic converter is preferably heat treated in a calcining furnace to convert the vanadium and tungsten compounds to its catalytically useful oxide form, $V_2O_5$ and $WO_3$, preferably at least 300° C., more preferably 425° C. Heating above 450° C. may cause the titanium dioxide crystal structure to change to the undesirable rutile crystal structure. Following heat treatment and calcinations, the concentrations of vanadium and tungsten are measured by x-ray fluorescence spectroscopy. Desirable concentrations of these metals can range from 0.3 wt % to 10 wt % vanadium pentoxide and 2 wt % to 8 wt % tungsten trioxide, based on the total weight of the impregnated substrate or catalytic converter.

EXAMPLES

The present disclosure is further illustrated by the following examples, which in no way should be construed as being limiting. That is, the specific methods and results described in the following examples are merely illustrative, and not limiting.

Ascorbic acid (AA) is a known reducing agent under acidic condition. The objective of the study described below was to evaluate if the ascorbic acid (e.g., the sodium salt of ascorbic acid) is able to prohibit the undesirable oxidation of iron under an alkaline condition.

Parameters:

Table 1 provides an overview of the parameters analyzed during this study.

TABLE 1

Analysis Parameters

| Parameter | Method | Detection Limit/Range |
|---|---|---|
| Appearance | Visual | NA |
| pH | FISHER SCIENTIFIC Accumet Basic pH-Meter | 0 to 14 |
| Oxidation Reduction Potential | OAKTON, ORP testr 10 | −999 mV to 1000 mV |
| Catalyst Composition Analysis | PANalytical Axios X-Ray Fluorescent Analyzer | NA |

Experimental Design

Pre-Testing:

An initial study was conducted to determine if sodium ascorbate will prevent the oxidation of iron under an alkaline condition.

Test 1

Figure 1:
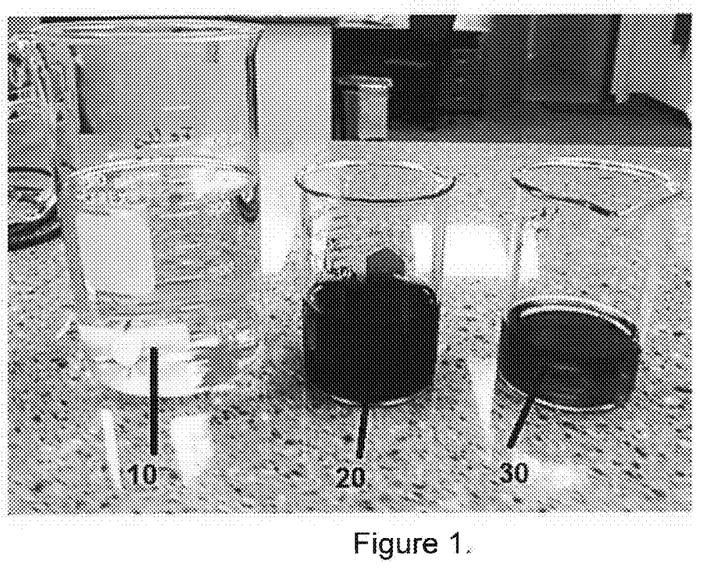
FIG. 1 shows from left to right a $FeCl_3$ solution, a 3% NaOH solution including ascorbic acid, and a 5% NaOH solution including ascorbic acid.

The testing was conducted according to the following numbered steps:

1. 500 ml of $FeCl_3$ 1000 ppm (0.1%) was prepared in a 500 ml beaker. The pH was 2.64, ORP was 640 mV, and the contents within the beaker were yellow in color as shown in FIG. 1 (See reference numeral 10). 100 ml of this solution was then poured into a 150 ml beaker, 2. 0.2 g of ascorbic acid ("AA") was added to the beaker. The pH was 2.27, ORP was 250 mV, and the color of the contents became clear.

3. Approximately 50 ml of 0.1N NaOH was then added to the beaker. The pH increased to 8.04, ORP was 350 mV, and the contents of the beaker became purple in color.

4. Poured 30 ml of liquid out since the beaker size was 150 ml.

5. 20 ml of 5N NaOH were added to approximately 120 ml of above solution (from step 4). The pH increased to 13.09, ORP was 780 mV, and the color was a dark green. See reference numeral 20 in FIG. 1. The resulting NaOH concentration was approximately 3% by weight and no building or formation of flocks were observed. The lack of flock formation indicates that AA keeps the Iron as $Iron^{2+}$ dissolved in the solution.

6. 50 ml of the solution formed in step 5 was obtained and combined with 10 ml of 5N NaOH. The pH was ~14 and the color became brown. See reference numeral 30 in FIG. 1. The resulting NaOH concentration was approximately 5% by weight. No building or formation of flocks was observed. The lack of flock formation indicates that AA keeps the Iron as $Iron^{2+}$ dissolved in the solution.

7. Approximately 1 ml of $H_2O_2$ was added to 10 ml of solution obtained from steps 5 and 6, respectively. In each case, brown/orange deposits began forming over a few hours and settling out. The $H_2O_2$ slowly oxidized the $Iron^{2+}$ to $Iron^{3+}$ and $Fe(OH)_3$ was precipitating.

Test 2

Figure 2:
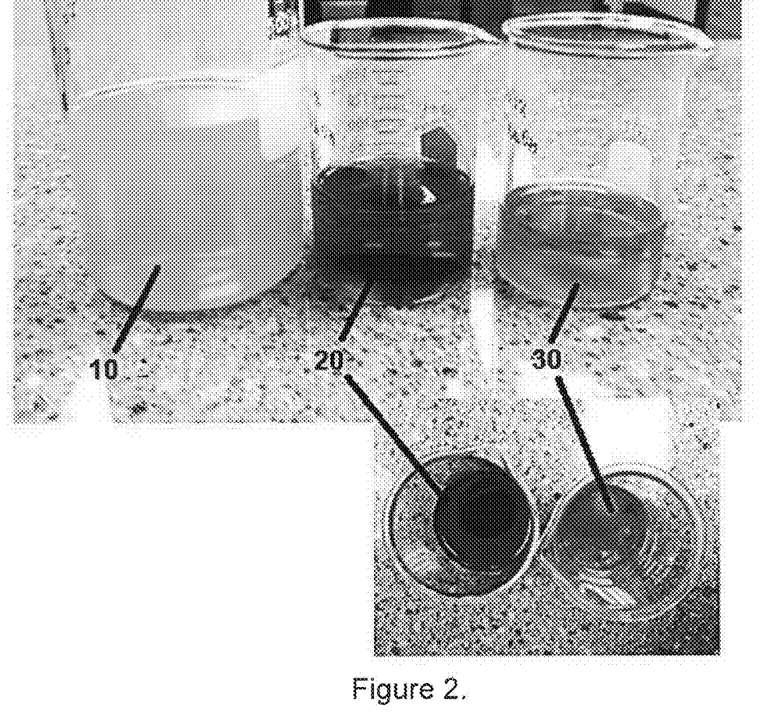
FIG. 2 shows from left to right a $FeCl_3$ solution, a 3% NaOH solution including ascorbic acid, and a 5% NaOH solution including ascorbic acid after an 80 hour rest period.

The $FeCl_3$ solution, as well as the solutions listed under steps 5 and 6 above, was examined after a rest period of 80 hrs. As shown in FIG. 2, the $FeCl_3$ solution 10 turned from clear/yellow to turbid/orange. This change in color can be attributed to the oxygen in the air slowly oxidizing Iron$^{2+}$ to Iron$^{3+}$ and Fe(OH)$_3$ was precipitating.

The solution under step 5 remained clear but the color changed from dark green to brown. A small amount of solids were visible on the bottom of the beaker. A transition phase was visible between the clear solution and the solids which appear to indicate that a portion of the solids is going back into solution (re-dissolution).

The solution under step 6 remained clear but the color changed from brown to orange. A small amount of solids were visible on the bottom of the beaker. A transition phase was visible between the clear solution and the solids which appear to indicate that a portion of the solids is going back into solution (re-dissolution).

Test 3: Catalyst Rejuvenation Testing

Tables 2 and 3 below show the catalyst rejuvenation tests conducted on iron-containing catalysts to determine if sodium ascorbate can improve the catalyst quality as compared to a cleaning process without sodium ascorbate. The catalysts used are of a honeycomb shape. In the following Tables, the term "Cascade" means that the sample was subjected to three (3) soaks (each lasting 30 minutes) in fresh deionized water.

TABLE 2

Testing Details for Catalyst 'A'

| Trial No. | Treatment Regime |
|---|---|
| N/A | Deactivated Catalyst |
| 1 | 0.3% H2SO4/0.3% AA 50° C. 2 hr |
|   | 1% NaOH 50° C. 1 hr |
|   | 2% NaOH Ultrasound 40° C. 1 hr |
|   | 0.3% H2SO4; Room temperature; 1 hr |
|   | 0.3% H2SO3/0.3% AA 50° C. 1 hr |
|   | Cascade |
| 2 | 0.3% H2SO4/0.3% AA 50° C. 2 hr |
|   | 1% NaOH/0.3% AA 50° C. 1 hr |
|   | 2% NaOH Ultrasound/0.3% VC 40° C. 1 hr |
|   | 0.3% H2SO4; Room temperature; 1 hr |
|   | Cascade |
| 3 | 5% NaOH 65° C. 1 hr |
|   | 5% NaOH Ultrasound 40° C. 1 hr |
|   | 0.3% H2SO4; Room temperature; 2 hr |
|   | Cascade |
| 4 | 5% NaOH/0.3% AA 65° C. 1 hr |
|   | 5% NaOH/0.3% AA Ultrasound 40° C. 1 hr |
|   | 0.3% H2SO4; Room temperature; 2 hr |
|   | Cascade |
| 5 | 1% NaOH/0.3% AA 50° C. 1 hr |
|   | 2% NaOH Ultrasound/0.3% VC 40° C. 1 hr |
|   | 0.3% H2SO4; Room temperature; 1 hr |
|   | Cascade |
| 6 | 0.3% H2SO4/0.3% AA 50° C. 2 hr |
|   | 5% NaOH 65° C. 1 hr |
|   | 5% NaOH Ultrasound 40° C. 1 hr |
|   | 0.3% H2SO4; Room temperature; 2 h |
|   | 0.3% H2SO4/0.3% AA 50° C. 1 hr |
|   | Cascade |
| 7 | 0.3% H2SO4/0.3% AA 50° C. 2 hr |
|   | 5% NaOH/0.3% AA 65° C. 1 hr |
|   | 5% NaOH/0.3% AA Ultrasound 40° C. 1 hr |
|   | 0.3% H2SO4; Room temperature; 2 hr |
|   | Cascade |

TABLE 2-continued

Testing Details for Catalyst 'A'

| Trial No. | Treatment Regime |
|---|---|
| 8 | 0.3% H2SO4/0.3% AA 50° C. 2 hr |
|   | 5% NaOH 65° C. 1 hr |
|   | 5% NaOH Ultrasound 40° C. 1 hr |
|   | 0.3% H2SO4; Room temperature; 2 hr |
|   | Cascade |

Trials 1 and 2 were the initial rejuvenation trials using a first iron removal step (0.3% H$_2$SO$_4$/0.3% AA at 50° C. for 2 hr) followed by Sodium Hydroxide caustic treatment steps. Trial 1 includes a second iron removal step while this was omitted in Trial 2. Instead VC was added to the caustic step which will form sodium ascorbate.

The XRF data in Table 3 illustrates that the iron content of the catalyst from Trials 1 and 2 is lower than the deactivated catalyst. However, Trial 1 was slightly more effective:

Deactivated Catalyst: surface Fe$_2$O$_3$ 2.15%, bulk Fe$_2$O$_3$ 1.24%

Trial 1: surface Fe$_2$O$_3$ 0.54%, bulk Fe$_2$O$_3$ 0.46%

Trial 2: surface Fe$_2$O$_3$ 0.69%, bulk Fe$_2$O$_3$ 0.58%.

It was also noticed, however, that this deactivated catalyst had an extreme surface blinding layer consisting of silica—represented by the SiO$_2$—and Aluminum- represented by the Al$_2$O$_3$ in the XRF data table for the deactivated catalyst. The surface values for SiO$_2$ was 17.95% and for Al$_2$O$_3$ was 4.45%. The rejuvenated catalyst from Trials 1 and 2 had a blinding layer of 9.53% and 8.47% SiO$_2$, respectively, and 2.60% and 2.17% Al$_2$O$_3$, respectively. The blinder layer also reduces the performance of a catalyst and shields poisons, including iron. Consequently, the blinding layer should preferably also be removed during the rejuvenation process.

Trials 3 and 4 were conducted to evaluate if an elevated caustic concentration was able to remove the blinding layer as compared to Trial 5 where the lower caustic concentrations were applied again. The results illustrate that a stronger caustic treatment facilitates a more effective removal of the blinding layer, but they also illustrate that an iron removal step is needed to reduce the iron content:

Trial 3: surface Fe$_2$O$_3$ 1.60%, bulk Fe$_2$O$_3$ 1.20%

Trial 4: surface Fe$_2$O$_3$ 1.32%, bulk Fe$_2$O$_3$ 1.10%

Trial 5: surface Fe$_2$O$_3$ 1.46%, bulk Fe$_2$O$_3$ 1.18%.

Trial 6 included a pre- and post-iron removal step with a strong caustic treatment in between. Trial 7 was identical to Trial 6, but without the post-iron removal step and the addition of VC to the caustic treatment. Trial 8 was identical to Trial 6, but omits the post-iron removal step. Fe$_2$O$_3$ measurements obtained after performing Trials 6-8 were as follows:

Trial 6: surface Fe$_2$O$_3$ 0.55%, bulk Fe$_2$O$_3$ 0.47%

Trial 7: surface Fe$_2$O$_3$ 0.64%, bulk Fe$_2$O$_3$ 0.57%

Trial 8: surface Fe$_2$O$_3$ 0.75%, bulk Fe$_2$O$_3$ 0.62%.

These results illustrate that the addition of VC to the caustic step in fact inhibits the oxidation of Iron$^{2+}$ to Iron$^{3+}$ since the catalyst from Trial 7 shows lower iron concentrations than the catalyst from Trial 8.

TABLE 3

XRF Results for the Catalyst 'A' Rejuvenation Trials

| | | Deactivated | | Trial 1 | | Trial 2 | | Trial 3 | | Trial 4 | |
|---|---|---|---|---|---|---|---|---|---|---|---|
| | | Surface | Bulk | Surface | Bulk | Surface | Bulk | Surface | Bulk | Surface | Bulk |
| SiO2 | % | 17.95 | 8.00 | 9.53 | 7.19 | 8.47 | 7.24 | 7.08 | 6.33 | 7.47 | 6.27 |
| Al2O3 | % | 4.45 | 2.06 | 2.60 | 2.06 | 2.17 | 2.06 | 2.31 | 2.04 | 2.76 | 2.01 |

TABLE 3-continued

XRF Results for the Catalyst 'A' Rejuvenation Trials

| | | | | | | | | | | | |
|---|---|---|---|---|---|---|---|---|---|---|---|
| Fe2O3 | % | 2.15 | 1.24 | 0.54 | 0.46 | 0.69 | 0.58 | 1.60 | 1.20 | 1.32 | 1.10 |
| TiO2 | % | 64.90 | 76.49 | 78.13 | 80.54 | 79.62 | 80.31 | 80.00 | 80.78 | 79.85 | 81.14 |
| CaO | % | 1.69 | 2.30 | 1.84 | 2.29 | 1.61 | 2.30 | 1.70 | 2.32 | 1.77 | 2.33 |
| MgO | % | 0.40 | 0.48 | 0.29 | 0.46 | 0.26 | 0.45 | 0.27 | 0.46 | 0.29 | 0.45 |
| BaO | % | 0.00 | 0.20 | 0.00 | 0.00 | 0.00 | 0.00 | 0.00 | 0.00 | 0.00 | 0.00 |
| Na2O | % | 0.55 | 0.20 | 0.05 | 0.06 | 0.06 | 0.06 | 0.04 | 0.07 | 0.05 | 0.08 |
| K2O | % | 0.12 | 0.09 | 0.03 | 0.04 | 0.02 | 0.04 | 0.02 | 0.04 | 0.02 | 0.04 |
| SO3 | % | 0.34 | 0.30 | 0.43 | 0.45 | 0.49 | 0.49 | 0.70 | 0.62 | 0.47 | 0.49 |
| P2O5 | % | 0.09 | 0.03 | 0.02 | 0.02 | 0.02 | 0.02 | 0.02 | 0.02 | 0.02 | 0.02 |
| V2O5 | % | 0.40 | 0.34 | 0.15 | 0.16 | 0.14 | 0.17 | 0.14 | 0.16 | 0.14 | 0.16 |
| WO3 | % | 6.51 | 7.95 | 6.18 | 6.26 | 6.25 | 6.27 | 5.92 | 5.84 | 5.66 | 5.78 |
| MoO3 | % | 0.02 | 0.01 | 0.00 | 0.00 | 0.00 | 0.00 | 0.00 | 0.00 | 0.00 | 0.00 |
| As | ppm | 1300 | 500 | 600 | 0 | 600 | 0 | 400 | 0 | 400 | 0 |
| Cr2O3 | % | 0.05 | 0.02 | 0.00 | 0.01 | 0.02 | 0.01 | 0.03 | 0.01 | 0.02 | 0.01 |

| | | Trial 5 | | Trial 6 | | Trial 7 | | Trial 8 | |
|---|---|---|---|---|---|---|---|---|---|
| | | Surface | Bulk | Surface | Bulk | Surface | Bulk | Surface | Bulk |
| SiO2 | % | 9.18 | 7.43 | 8.18 | 6.15 | 6.91 | 6.13 | 7.53 | 5.99 |
| Al2O3 | % | 2.26 | 2.08 | 3.00 | 2.01 | 2.49 | 1.99 | 2.69 | 1.96 |
| Fe2O3 | % | 1.46 | 1.18 | 0.55 | 0.47 | 0.64 | 0.57 | 0.75 | 0.62 |
| TiO2 | % | 77.73 | 79.35 | 79.44 | 81.81 | 81.29 | 81.79 | 80.46 | 82.13 |
| CaO | % | 1.71 | 2.27 | 1.83 | 2.31 | 1.73 | 2.33 | 1.78 | 2.22 |
| MgO | % | 0.28 | 0.45 | 0.32 | 0.45 | 0.28 | 0.45 | 0.31 | 0.44 |
| BaO | % | 0.00 | 0.00 | 0.00 | 0.00 | 0.00 | 0.00 | 0.00 | 0.00 |
| Na2O | % | 0.05 | 0.06 | 0.05 | 0.06 | 0.04 | 0.05 | 0.04 | 0.05 |
| K2O | % | 0.03 | 0.04 | 0.02 | 0.04 | 0.02 | 0.04 | 0.02 | 0.04 |
| SO3 | % | 0.46 | 0.47 | 0.55 | 0.65 | 0.58 | 0.69 | 0.63 | 0.73 |
| P2O5 | % | 0.02 | 0.03 | 0.02 | 0.02 | 0.02 | 0.02 | 0.01 | 0.02 |
| V2O5 | % | 0.16 | 0.16 | 0.13 | 0.16 | 0.15 | 0.17 | 0.14 | 0.16 |
| WO3 | % | 6.45 | 6.35 | 5.76 | 5.75 | 5.70 | 5.65 | 5.49 | 5.63 |
| MoO3 | % | 0.00 | 0.00 | 0.00 | 0.00 | 0.00 | 0.00 | 0.00 | 0.00 |
| As | ppm | 600 | 0 | 300 | 0 | 400 | 0 | 300 | 0 |
| Cr2O3 | % | 0.02 | 0.01 | 0.00 | 0.01 | 0.01 | 0.01 | 0.00 | 0.01 |

Based on the findings for Catalyst 'A', another iron-containing catalyst—Catalyst 'B'—was treated using the same rejuvenation recipe as described in Trials 6 and 7 from Catalyst 'A'.

TABLE 4

Testing Details for Catalyst 'B'

| Trial No. | Treatment |
|---|---|
| N/A | Deactivated |
| 9 | 5% NaOH 60° C. 2 hr |
| | 5% NaOH Ultrasound 45° C. 1 hr |
| | 0.3% H2SO4 40° C. 2 hr |
| | 0.3% H2SO4/0.3% AA 50° C. 2 hr |
| | Cascade |
| 10 | 0.3% H2SO4/0.3% AA 50° C. 2 hr |
| | 5% NaOH/0.3% AA 60° C. 2 hr |
| | 5% NaOH/0.3% AA US 45° C. 1 hr |
| | 0.3% H2SO4 40° C. 2 hr |
| | Cascade |

TABLE 5

XRF Results for the Catalyst 'B' Rejuvenation Trials

| | | Deactivated Surface | Deactivated Bulk | Trial 9 Surface | Trial 9 Bulk | Trial 10 Surface | Trial 10 Bulk |
|---|---|---|---|---|---|---|---|
| SiO2 | % | 17.36 | 3.64 | 3.12 | 2.56 | 2.65 | 2.51 |
| Al2O3 | % | 6.58 | 1.06 | 1.29 | 0.80 | 0.74 | 0.78 |
| Fe2O3 | % | 5.88 | 1.58 | 0.68 | 0.27 | 0.37 | 0.23 |
| TiO2 | % | 61.70 | 83.55 | 86.65 | 87.83 | 88.27 | 88.22 |
| CaO | % | 1.01 | 1.33 | 1.07 | 1.26 | 1.01 | 1.22 |
| MgO | % | 0.36 | 0.10 | 0.11 | 0.09 | 0.06 | 0.10 |
| BaO | % | 0.00 | 0.17 | 0.00 | 0.00 | 0.00 | 0.00 |
| Na2O | % | 0.00 | 0.04 | 0.01 | 0.03 | 0.00 | 0.02 |
| K2O | % | 0.02 | 0.02 | 0.01 | 0.01 | 0.00 | 0.01 |
| SO3 | % | 0.44 | 0.61 | 0.71 | 0.99 | 0.66 | 0.83 |
| P2O5 | % | 0.22 | 0.05 | 0.02 | 0.03 | 0.02 | 0.02 |
| V2O5 | % | 0.14 | 0.23 | 0.13 | 0.18 | 0.15 | 0.18 |
| WO3 | % | 5.36 | 7.18 | 5.73 | 5.74 | 5.72 | 5.70 |
| MoO3 | % | 0.21 | 0.23 | 0.08 | 0.06 | 0.09 | 0.05 |
| As | ppm | 1000 | 500 | 400 | 0 | 0 | 0 |
| Cr2O3 | % | 0.07 | 0.02 | 0.03 | 0.01 | 0.00 | 0.01 |

As illustrated by the data in Table 5, catalyst treatment regime in which the caustic solution containing ascorbic acid (AA) was used provided a noticeably lower iron concentration on both the surface and in the bulk.

Deactivated Catalysts: surface $Fe_2O_3$ 5.88%, bulk $Fe_2O_3$ 1.58%

Trial 9: surface $Fe_2O_3$ 0.68%, bulk $Fe_2O_3$ 0.27%

Trial 10: surface $Fe_2O_3$ 0.37%, bulk $Fe_2O_3$ 0.23%.

To further confirm the benefits associated with methods in which ascorbic acid is carried through the NaOH steps, an additional trail (i.e., Trial 11) was performed to provide a comparison to the results realized in Trial 10. That is, the treatment regime used in Trial 11 was identical to that of Trial 10 with the exceptions that (i) ascorbic acid was not included in the NaOH treatment steps in Trial 11 and the treatment regime of Trial 11 included a post-iron removal step (i.e., 0.3% $H_2SO_4$/0.3% AA; 50° C.; 2 hr. See Table 6.

TABLE 6

Testing Details for Catalyst 'B'

| Trial No. | Treatment |
|---|---|
| 10 | 0.3% H2SO4/0.3% AA 50° C. 2 hr |
|  | 5% NaOH/0.3% AA 60° C. 2 hr |
|  | 5% NaOH/0.3% AA Ultrasound; 45° C. 1 hr |
|  | 0.3% H2SO4 40° C. 2 hr |
|  | Cascade |
| 11 | 0.3% H2SO4/0.3% AA; 50° C.; 2 hr |
|  | 5% NaOH; 60° C.; 2 hr |
|  | 5% NaOH; Ultrasound; 45° C.; 1 hr |
|  | 0.3% H2SO4; 40° C.; 2 hr |
|  | 0.3% H2SO4/0.3% AA; 50° C.; 2 hr |
|  | Cascade |

TABLE 7

XRF Results for the Catalyst 'B' Rejuvenation Trials 10 and 11.

|  |  | Deactivated Surface | Deactivated Bulk | Trial 10 Surface | Trial 10 Bulk | Trial 11 Surface | Trial 11 Bulk |
|---|---|---|---|---|---|---|---|
| SiO2 | % | 17.36 | 3.54 | 2.65 | 2.51 | 3.69 | 2.89 |
| Al2O3 | % | 6.58 | 1.06 | 0.74 | 0.78 | 1.36 | 0.88 |
| Fe2O3 | % | 5.88 | 1.58 | 0.37 | 0.23 | 0.38 | 0.20 |
| TiO2 | % | 61.70 | 83.55 | 88.27 | 88.22 | 86.51 | 87.66 |
| CaO | % | 1.01 | 1.33 | 1.01 | 1.22 | 1.12 | 1.37 |
| MgO | % | 0.36 | 0.10 | 0.06 | 0.10 | 0.12 | 0.08 |
| BaO | % | 0.00 | 0.17 | 0.00 | 0.00 | 0.00 | 0.00 |
| Na2O | % | 0.00 | 0.04 | 0.00 | 0.02 | 0.00 | 0.07 |
| K2O | % | 0.02 | 0.02 | 0.00 | 0.01 | 0.01 | 0.01 |
| SO3 | % | 0.44 | 0.61 | 0.66 | 0.83 | 0.59 | 0.64 |
| P2O5 | % | 0.22 | 0.05 | 0.02 | 0.02 | 0.02 | 0.03 |
| V2O5 | % | 0.14 | 0.23 | 0.15 | 0.18 | 0.15 | 0.13 |
| WO3 | % | 5.36 | 7.18 | 5.72 | 5.70 | 5.68 | 5.95 |
| MoO3 | % | 0.21 | 0.23 | 0.09 | 0.05 | 0.11 | 0.07 |
| As | ppm | 1000 | 500 | 0 | 0 | 500 | 0 |
| Cr2O3 | % | 0.07 | 0.02 | 0.00 | 0.01 | 0.00 | 0.01 |

As illustrated by the data in Table 7, the catalyst treatment regime (i.e., Trial 10) in which the caustic solution containing ascorbic acid (AA) was used provided a nearly identical iron concentration on both the surface and in the bulk despite not including a post-iron removal step (i.e., 0.3% $H_2SO_4$/0.3% AA; 50° C.; 2 hr).

Deactivated Catalysts: surface Fe2O3 5.88%, bulk Fe2O3 1.58%

Trial 10: surface Fe2O3 0.37%, bulk Fe2O3 0.23%

Trial 11: surface Fe2O3 0.38%, bulk Fe2O3 0.20%.

CONCLUSION

Sodium ascorbate can inhibit the oxidation of Iron$^{2+}$ to Iron$^{3+}$. This allows for the omission of the post-iron removal step while producing a catalyst with lower iron content compared to the deactivated catalyst and even lower iron content than a catalyst treated with the pre- and post-iron removal steps.

The foregoing disclosure provides illustrative embodiments of the invention and is not intended to be limiting. As understood by those of skill in the art, the overall invention, as defined by the claims, encompasses other preferred embodiments not specifically enumerated herein.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of removing iron from a catalytic converter having an accumulation of one or more iron compounds, comprising:
    (i) treating the catalytic converter with a substantially aqueous alkaline solution, said aqueous alkaline solution comprises an antioxidant, wherein the antioxidant is selected from the group consisting of substituted phenols, hydroquinones, catechols, aliphatic mercapto compounds, araliphatic mercapto compounds, aromatic mercapto compounds, dithiocarbonates, enediols, phosphites, phosphonates, and combinations thereof; and
    (ii) removing at least a portion of the one or more iron compounds accumulated on the catalytic converter.

2. The method of claim 1, wherein the antioxidant comprises an enediol.

3. The method of claim 1, wherein the antioxidant is selected from the group consisting of ascorbic acid, mineral ascorbate salts, ammonium ascorbate, and combinations thereof.

4. The method of claim 1, wherein the antioxidant comprises sodium ascorbate.

5. The method of claim 1, wherein the aqueous alkaline solution has a pH from 7 to 14.

6. The method of claim 1, wherein the aqueous alkaline solution has a pH from 8 to 14.

7. The method of claim 1, wherein the aqueous alkaline solution comprises from 0.05 to 5.00 wt. % of said antioxidant.

8. The method of claim 1, wherein the aqueous alkaline solution comprises from 0.1 to 2.0 wt. % of said antioxidant.

9. The method of claim 1, wherein the aqueous alkaline solution comprises from 0.1 to 1.0 wt. % of said antioxidant.

10. The method of claim 1, wherein the aqueous alkaline solution comprises an alkali metal hydroxide.

11. The method of claim 10, wherein the alkali metal hydroxide is sodium hydroxide.

12. The method of claim 1, further comprising a step of treating the catalytic converter with a substantially aqueous acidic solution.

13. The method of claim 12, wherein the catalytic converter is treated with the substantially aqueous acidic solution prior to the step of treating the catalytic converter with a substantially aqueous alkaline solution.

14. The method of claim 13, wherein the substantially aqueous acidic solution comprises an antioxidant.

15. The method of claim 14, wherein the antioxidant comprises substituted phenols, hydroquinones, catechols, aliphatic mercapto compounds, araliphatic mercapto compounds, aromatic mercapto compounds, dithiocarbonates, enediols, phosphites, phosphonates, or combinations thereof.

16. The method of claim 14, wherein the antioxidant is selected from the group consisting of ascorbic acid, mineral ascorbate salts, ammonium ascorbate, and combinations thereof.

17. The method of claim 13, wherein the substantially aqueous acidic solution comprises an ammonium-based acidic reactive salt and an antioxidant.

18. The method of claim 17, wherein the antioxidant comprises substituted phenols, hydroquinones, catechols, aliphatic mercapto compounds, araliphatic mercapto compounds, aromatic mercapto compounds, dithiocarbonates, enediols, phosphites, phosphonates, or combinations thereof.

19. The method of claim 17, wherein the antioxidant is selected from the group consisting of ascorbic acid, mineral ascorbate salts, ammonium ascorbate, and combinations thereof.

20. The method of claim 17, wherein the ammonium-based acidic reactive salt is selected from the group consisting of ammonium chloride, ammonium fluoride, ammonium nitrate, ammonium sulfate, and combinations thereof.

21. The method of claim 1, wherein the step of treating the catalytic converter with a substantially aqueous alkaline solution is performed at a temperature between 10-80° C.

22. The method of claim 1, wherein the step of treating the catalytic converter with a substantially aqueous alkaline solution further comprises at least one of moving the catalytic converter within the substantially aqueous alkaline solution, agitating the substantially aqueous alkaline solution, and recirculating substantially aqueous alkaline solution.

23. The method of claim 1, wherein the step of treating the catalytic converter with a substantially aqueous alkaline solution further comprises subjecting the substantially aqueous alkaline solution to an ultrasonic treatment for at least a portion of the time in which the catalytic converter is at least partially submerged in the substantially aqueous alkaline solution.

24. The method of claim 1, further comprising a pretreatment cleaning step prior to the step of treating the catalytic converter with a substantially aqueous alkaline solution, said pretreatment cleaning step comprising directly or indirectly physically removing at least a portion of any dust or fly ash on the catalytic converter.

25. The method to claim 24, wherein said pretreatment cleaning step comprises spraying the catalytic converter with a fluid, scrapping dust or fly ash of the catalytic converter, subjecting the catalytic converter to an ultrasonic treatment, subjecting the catalytic convertor to a blasting technique, or combinations thereof.

26. The method according to claim 1, wherein the catalytic converter comprises a DeNOx catalyst.

27. The method according to claim 1, wherein the catalytic converter comprises a SCR catalyst.

28. The method according to claim 1, wherein the catalytic converter comprises a substantially deactivated catalytic converter.

29. A method of regenerating a catalytic converter having an accumulation of one or more iron compounds, comprising:
(i) treating the catalytic converter with a substantially aqueous alkaline solution, said aqueous alkaline solution comprises an antioxidant wherein the antioxidant comprises substituted phenols, hydroquinones, catechols, aliphatic mercapto compounds, araliphatic mercapto compounds, aromatic mercapto compounds, dithiocarbonates, enediols, phosphites, phosphonates, or combinations thereof;
(ii) removing at least a portion of the one or more iron compounds accumulated on the catalytic converter;
(iii) washing the catalytic converter with water or an aqueous solution;
(iv) at least partially drying the catalytic converter;
(v) impregnating the catalytic converter with at least one $NO_x$ removal catalyst with catalytic active metals to provide a regenerated catalytic converter.

30. The method according to claim 29, wherein the catalytic converter comprises a DeNOx catalyst.

31. The method according to claim 29, wherein the catalytic converter comprises a SCR catalyst.

32. The method of claim 29, wherein the antioxidant comprises an enediols.

33. The method of claim 29, wherein the antioxidant is selected from the group consisting of ascorbic acid, mineral ascorbate salts, ammonium ascorbate, and combinations thereof.

34. A regenerated catalytic converter produced according to the method of claim 29.

* * * * *